(12) United States Patent
Nguyen et al.

(10) Patent No.: US 11,022,697 B2
(45) Date of Patent: Jun. 1, 2021

(54) GPS ACCURACY IMPROVEMENT FOR LUMINAIRES

(71) Applicant: Current Lighting Solutions, LLC, East Cleveland, OH (US)

(72) Inventors: Nam N S Nguyen, Montreal (CA); Beno Koblents, Montreal (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 1041 days.

(21) Appl. No.: 14/972,108

(22) Filed: Dec. 17, 2015

(65) Prior Publication Data

US 2017/0160396 A1 Jun. 8, 2017

Related U.S. Application Data

(60) Provisional application No. 62/263,602, filed on Dec. 4, 2015.

(51) Int. Cl.
*G01S 19/22* (2010.01)
*G01S 19/14* (2010.01)
*G01S 19/39* (2010.01)

(52) U.S. Cl.
CPC .............. *G01S 19/22* (2013.01); *G01S 19/14* (2013.01); *G01S 19/39* (2013.01); *G01S 19/396* (2019.08)

(58) Field of Classification Search
CPC .................................. G01S 19/22; G01S 19/39
(Continued)

(56) References Cited

U.S. PATENT DOCUMENTS 6,490,524 B1 12/2002 White et al.
7,298,327 B2 11/2007 Dupray et al.
(Continued)

FOREIGN PATENT DOCUMENTS

EP 2 947 970 A2 11/2015
GB 2405279 A 2/2005
(Continued)

OTHER PUBLICATIONS

ISM300F2-C5-V0005 (5Hz update rate), Retreived from Internet URL: http://www.inventeksys.com/products-page/gps-modules/ism300f2-c5-v0005-5hz-update-rate/, on Nov. 20, 2017, pp. 1-3.
(Continued)

*Primary Examiner* — Erin F Heard
*Assistant Examiner* — Helena H Seraydaryan
(74) *Attorney, Agent, or Firm* — Buckley, Maschoff & Talwalkar LLC

(57) ABSTRACT

Provided are systems, methods, and computer-readable storage media for improving accuracy of GPS in luminaires. For example, in one embodiment, there is provided a method that includes receiving, at a controller coupled to a luminaire, a GPS message. The method further includes extracting information from the GPS message, the information including data associated with a plurality of coordinates. Furthermore, the method can include determining, based on the information and not from the coordinates, an error associated with each coordinate of the plurality of coordinates. The method can also include discarding coordinates for which the error fails to satisfy a predetermined condition. Moreover, the method can include selecting, as a location of the luminaire, the coordinates for which the error satisfies the predetermined condition.

20 Claims, 5 Drawing Sheets

(58) Field of Classification Search
USPC .................................................. 342/357.61
See application file for complete search history.

(56) References Cited

U.S. PATENT DOCUMENTS

| | | | |
|---|---|---|---|
| 7,512,492 B2 | 3/2009 | Irvin et al. | |
| 9,057,606 B2 | 6/2015 | Wolf et al. | |
| 2003/0090414 A1 | 5/2003 | Syrjarinne et al. | |
| 2007/0115171 A1* | 5/2007 | Rahman | G01S 19/20 342/357.58 |
| 2009/0034258 A1* | 2/2009 | Tsai | H05B 37/02 362/253 |
| 2014/0159952 A1 | 6/2014 | Fitzgerald et al. | |
| 2015/0323675 A1 | 11/2015 | Munoz et al. | |

FOREIGN PATENT DOCUMENTS

| | | | |
|---|---|---|---|
| WO | 2007/126662 A2 | 11/2007 | |
| WO | 2015/077514 A1 | 5/2015 | |
| WO | WO-2015077514 A1 * | 5/2015 | ............. G01S 19/14 |

OTHER PUBLICATIONS

"LightGrid outdoor wireless lighting control system," Retreived from Internet URL: https://products.currentbyge.com/sites/products.currentbyge.com/files/document_file/94439-GE-LightGrid-Wireless-Lighting-Control-Systems-Brochure.pdf, on Nov. 20, 2017, pp. 1-8.
International Search Report and Written Opinion issued in connection with corresponding PCT Application No. PCT/US2016/064269 dated May 11, 2017.

* cited by examiner

GPS ACCURACY IMPROVEMENT FOR LUMINAIRES

CROSS-REFERENCE TO RELATED APPLICATIONS

The present application claims priority from U.S. Provisional Patent Application No. 62/263,602 which was filed on Dec. 4, 2015, and the content of which is incorporated herein by reference in its entirety.

TECHNICAL FIELD

The present disclosure generally relates to global positioning systems (GPS). More particularly, the present disclosure relates to GPS accuracy improvement for a luminaire.

BACKGROUND

Advanced functionalities are now being added to luminaires as a result of the maturity of Internet of Things (IoT) technologies. Such functionalities include the online monitoring of luminaire data, such as lumen output, calibration data, power delivery, metering data, ON & OFF schedules, and maintenance records. One key functionality that is desired is the ability to associate a geographical location with the luminaire. This is typically achieved with a global positioning system (GPS) module located in a node attached to the luminaire.

The accuracy in the location reported by the node plays an important role in maintaining the luminaire. Specifically, accurate location data can save a company significant amount of time and fuel when dispatching a technician for maintenance tasks. In dense urban areas, GPS modules can lack a clear view of the sky, and the satellite signals they use to calculate position have a very high likelihood of being signals that are reflected off surrounding buildings and terrain features. Computation of coordinates using reflected signals lead to significant errors in estimating the true position of luminaires fitted with GPS-equipped nodes. Such errors lead to inaccurate location reporting after commissioning a luminaire, which ultimately leads to increased cost in maintenance, because a technician must search for the luminaire since its accurate location is not available.

SUMMARY

The embodiments featured herein help solve or mitigate the above-noted issues, as well as other issues known in the art. Specifically, the embodiments mitigate position errors of luminaires and/or of other stationary devices on an electric grid, without the use of costly and complex GPS receivers. The exemplary embodiments allow the estimation of whether received GPS coordinates have a high error relative to an actual position of a luminaire. Coordinates that are found to have a high error are discarded, and the remaining coordinates are averaged over time to provide a more accurate estimate of the true position of the luminaire.

For example, in one embodiment, there is provided a method that includes receiving, at a controller coupled to a luminaire, a GPS message. The method further includes extracting information from the GPS message, the information including data associated with a plurality of coordinates. Furthermore, the method can include determining, based on the information and not from the coordinates, an error associated with each coordinate of the plurality of coordinates. The method can also include discarding coordinates for which the error fails to satisfy a predetermined condition. Moreover, the method can include selecting, as a location of the luminaire, the coordinates for which the error satisfies the predetermined condition.

In another exemplary embodiment, there is provided a computer-readable storage medium comprising instructions that, when executed by a processor, cause the processor to perform certain operations. The operations can include receiving, at a controller coupled to a luminaire, a GPS message. The operations can further include extracting information from the GPS message, the information including data associated with a plurality of coordinates. Furthermore, the operations can include determining, based on the information and not from the coordinates, an error associated with each coordinate of the plurality of coordinates. The operations can also include discarding coordinates for which the error fails to satisfy a predetermined condition. Moreover, the operations can include selecting, as a location of the luminaire, the coordinates for which the error satisfies the predetermined condition.

In yet another exemplary embodiment, there is provided a system comprising a processor and a memory storing instructions that, when executed by the processor, cause the processor to perform certain operations. The operations can include receiving, at a controller coupled to a luminaire, a GPS message. The operations can further include extracting information from the GPS message, the information including data associated with a plurality of coordinates. Furthermore, the operations can include determining, based on the information and not from the coordinates, an error associated with each coordinate of the plurality of coordinates. The operations can also include discarding coordinates for which the error fails to satisfy a predetermined condition. Moreover, the operations can include selecting, as a location of the luminaire, the coordinates for which the error satisfies the predetermined condition.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
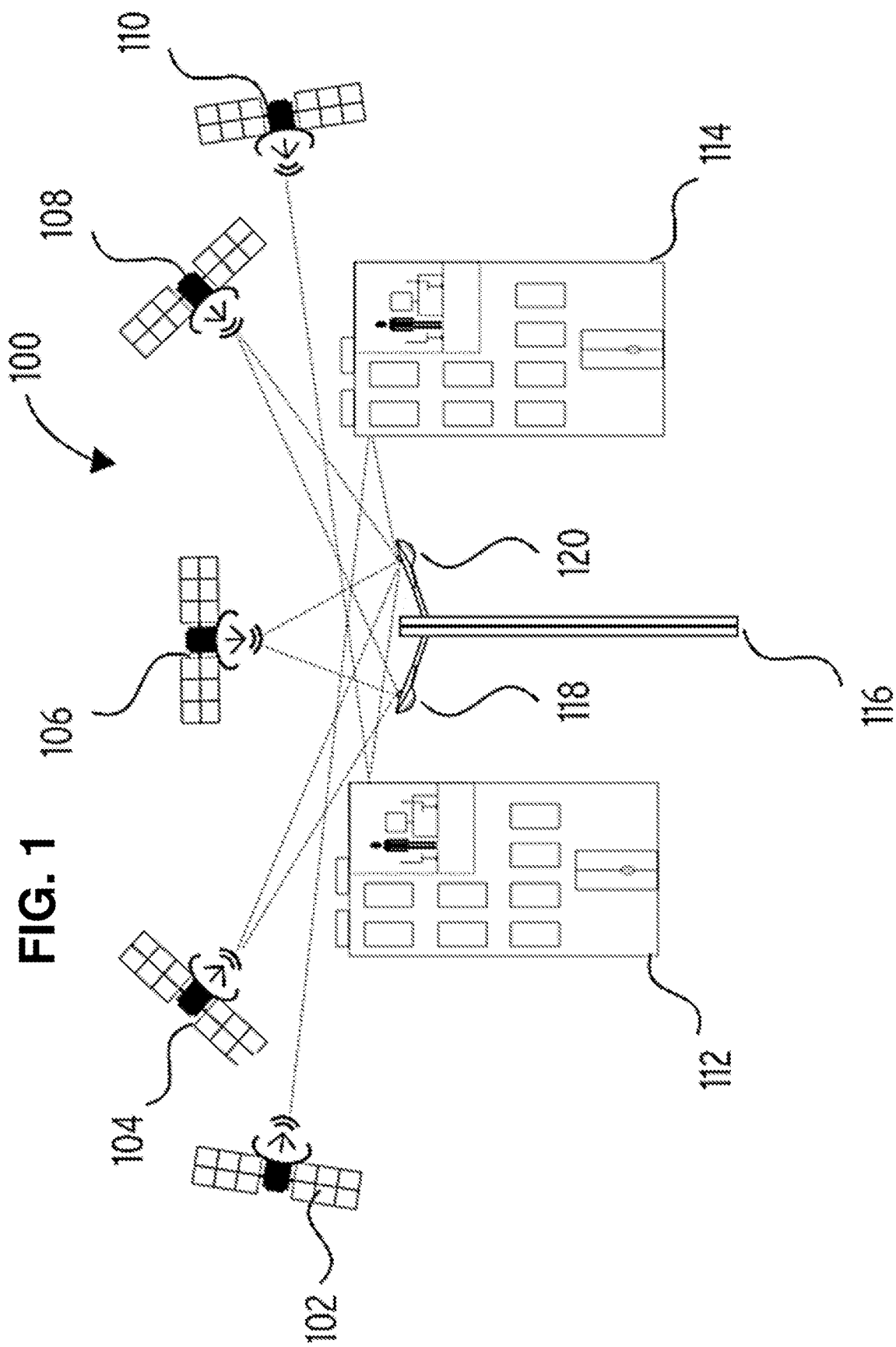
FIG. 1 is an illustration of a system, according to an embodiment.

FIG. 1 is an illustration of a system 100, according to an embodiment. System 100 can include a constellation of satellites including a plurality of global positioning system (GPS) satellites (satellites 102, 104, 106, 109, and 110, for example). Furthermore, system 100 can include a plurality of luminaires (e.g. luminaire 118 and luminaire 120, mounted on pole 116), which are each fitted with a controller (not shown) capable of generating GPS messages from signals received from one or more satellites of the constellation. The messages can have contents and formats characteristic of messages typically used in GPS communication applications, as can be readily recognized by one of skill in the art. The messages can be received using GPS hardware located in the controller.

For example, the messages can be National Marine Electronics Association (NMEA) messages, which are a standard means of providing information to a GPS receiver module. In addition, exemplary embodiments of the invention can support RMC, GSA, and GSV messages. RMC messages can contain latitude, longitude, and time information. GSA messages can include an identification (PRN) of all the satellites that provide information used for determining a position, and they can also include Geometric Dilution of Precision (GDP) information. Furthermore, exemplary embodiments of the invention can support GSV messages, which can provide PRN information, signal-to-noise-ratio (SNR) information, and elevation and azimuth angles associated with one or more satellites used to estimate position.

During a given day, a satellite may be in a line of sight position of any one of luminaire 118 and/or luminaire 120. For example, as shown in FIG. 1, satellite 104, satellite 106, and satellite 108 are each in a line of sight position of luminaires 118 and 120, which means, notwithstanding atmospheric disturbances, a signal from either one of these satellites can directly reach the luminaires, as illustrated by the dashed lines originating from the aforementioned satellites.

Some satellites of the constellation can also be in an out-of-sight position of luminaire 118 and luminaire 120. Such is the case of satellite 102 and satellite 110. Nevertheless, signals from these out-of-sight satellites can still reach the luminaires by reflecting off terrain features and/or bouncing off building 112 and building 114, as indicated in the FIG. 1. In sum, at any given time, the controller of a given luminaire may receive signals from a plurality of satellites, some of which can be out of sight and some in sight.

Figure 2:
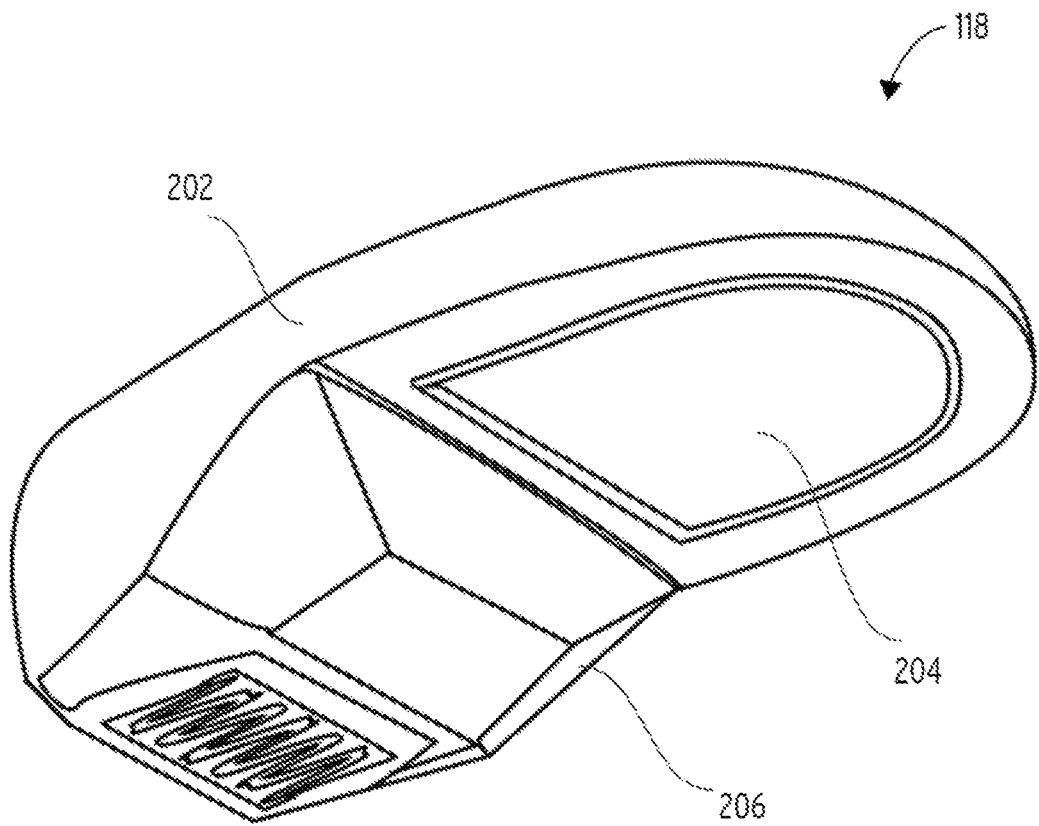
FIG. 2 is an illustration of a luminaire with which embodiments of the invention may be practiced.

FIG. 2 is an illustration of a luminaire 118 (or 120) in which embodiments of the invention may be practiced. Luminaire 118 includes a dorsal portion 202 on to which is mounted a controller receptacle (not shown). Luminaire 118 further includes a cavity in which are placed light sources, such as light emitting diodes, for example. The cavity may be covered with a transparent glass 204 that serves to protect the light sources from the elements. In some embodiments, glass 204 may also function as a lens. Luminaire 118 can further include a section 206 that is reserved for a wide variety of additional components. For example, section 206 may be transparent and include cameras. Furthermore, while luminaire 118 is shown in FIG. 1 to be mounted on pole 116, other mounting arrangements may be used, without departing from the teachings set forth herein. Moreover, while a luminaire is disclosed as the general platform with which the invention may be practiced, other platforms such as traffic lights may be used. In general, any hardware deployed in a geographic location for which automatic commissioning is desired can benefit from the invention.

Figure 3:
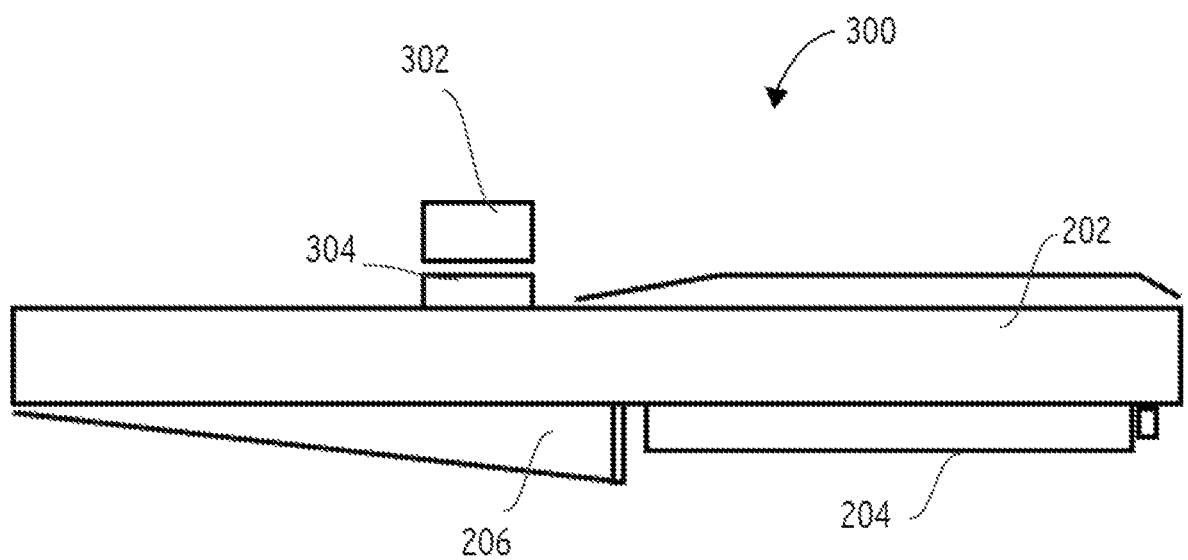
FIG. 3 is a side view of a luminaire, according to an embodiment.

FIG. 3 illustrates a side view 300 of luminaire 118 (or 120), according to an exemplary embodiment. As mentioned above, the dorsal portion 202 of luminaire 118 can include a controller receptacle (illustrated as socket 304). Socket 304 can receive a controller 302 that includes a variety of hardware configured to control one or more functions of luminaire 118. This hardware can include microcontrollers, processors, and the like, memory devices and the like, which can be programmed to perform the one or more functions.

For example, controller 302 can include a hardware configured to generated control signal may be used to turn on (activate) or turn off (deactivate) one or more light sources included in luminaire 118, depending on the ambient light intensity. In some embodiments, controller 302 can include metering hardware configured to monitor the power consumption of the luminaire. Furthermore, controller 302 can include hardware configured to provide wireless and/or wired connectivity, such that a technician may query and/or reconfigure luminaire 118 without having direct access to it. Such hardware can include a monopole antenna, modulators, demodulators, and other communication hardware known in the art. Yet in other embodiments, controller 302 can include a GPS transceiver module capable of receiving satellite data (as described in the context of FIG. 1). Controller 302 can include hardware such as processors and microcontrollers that can be programmed with software to execute instructions that cause the processors and/or microcontrollers to conduct one or more post-processing operations on received GPS data. Such post-processing operations yield at least an estimated position of the controller (hence a position of the luminaire) based on the received GPS data.

One of ordinary skill in the art will readily understand that other functionalities can be implemented with controller 302, other than those described above, and this, without departing from the scope of the invention.

Figure 4:
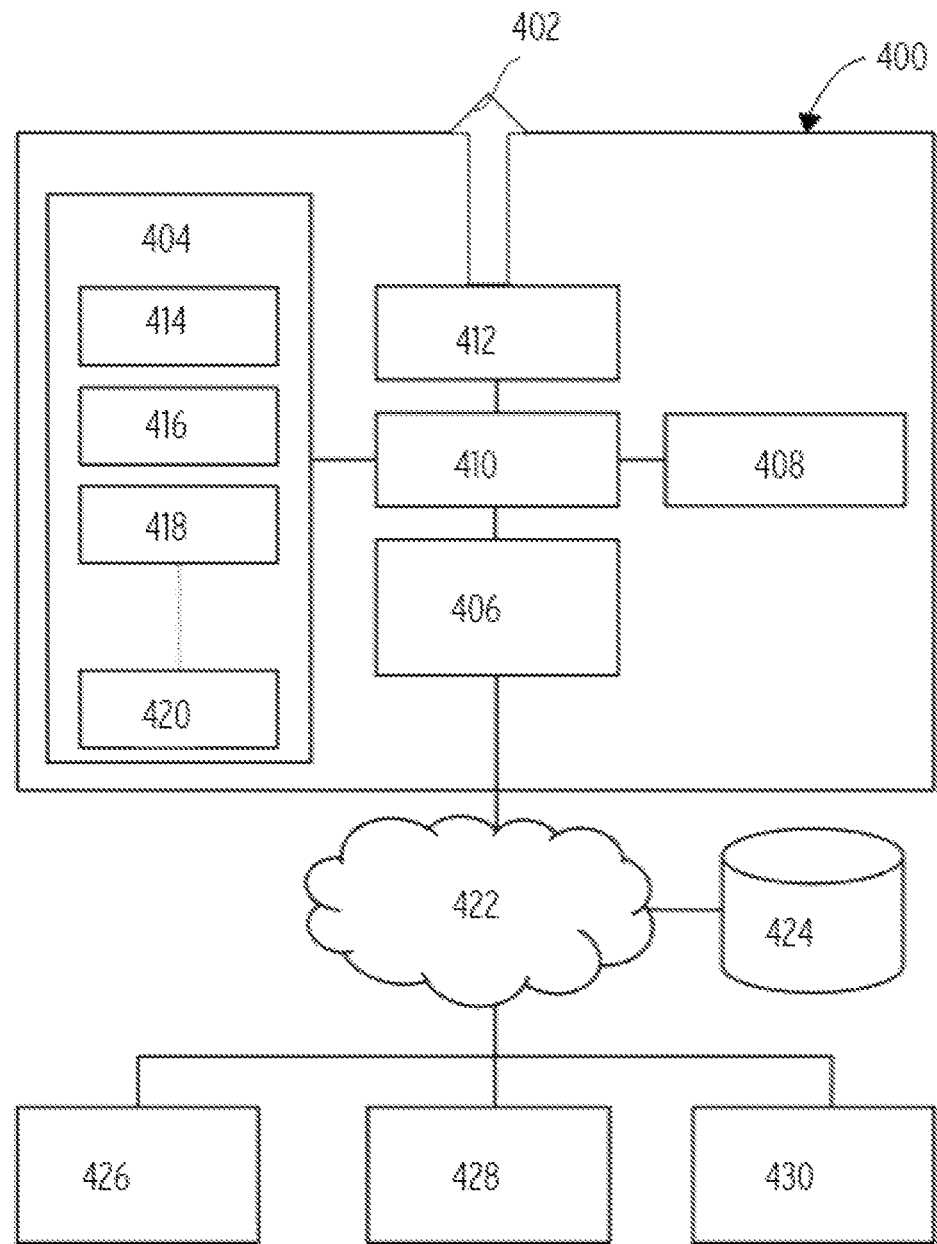
FIG. 4 is an illustration of a block diagram of a controller, according to an embodiment.

FIG. 4 shows a block diagram of a controller 400, which can be fitted to luminaire 118 (or 120). Controller 400 can be like the controller 302 shown in FIG. 3. Furthermore, FIG. 4 depicts how controller 400 can interface with a database 424, a data center 426, a gateway device 428, and with a remote diagnostics device 430, all via network 422. One of ordinary skill in the art will readily appreciate that controller 400 can interface with a plurality of devices, which are not limited to those shown in FIG. 4. Furthermore, as noted above, controller 400 can receive GPS messages via a GPS module 408, which can include hardware for receiving GPS signals from satellites, the hardware including components well known in the art.

Moreover, controller 400 can include a bus 402 adapted to interface with socket 304. Controller 400 is a programmable device, or it may be a programmable module located in a much larger device. For example, controller 400 can be part of a node mounted on socket 304, the node having a plurality of functionalities. For example, the node may include a photo-electric element configured to sense ambient light and provide dimming commands to the luminaire, based on predetermined ambient light level thresholds. Furthermore, the node may include wireless communication hardware, or communication hardware that use power line communication protocols. Furthermore, the node can include hardware for controlling one or more cameras located in luminaire 118, in addition to hardware capable of processing, and transmitting data from the one or more cameras. One of skill in the art will readily recognize that such a node may have additional functionalities/hardware beyond those described herein.

Controller 400 may include one or more hardware and/or software components configured to fetch, decode, execute, store, analyze, distribute, evaluate, and/or categorize information. Furthermore, controller 400 may be battery-powered, or solar-powered, or it may include a power supply specifically suited for drawing power from a powerline or from a power supply of luminaire 118.

Controller 400 may be configured to function as a client device communicatively coupled to one or more devices via network 422. Such devices may be, for example, and not by limitation, database 424, data center 426, gateway device 428, and remote diagnostics device 430.

Controller 400 can be communicatively coupled to a database 424 via a network 422 using a communication network interface 406. In some embodiments, controller 400 may fetch instructions from database 424 and/or use database 424 as a storage medium to log operational parameters, measurements, configuration, and/or any other data pertinent to the functions of controller 400 and/or to the functions and/or status of luminaire 100.

Communication network interface 406 may include one or more components configured to transmit and receive data via communication network 422, such as one or more modulators, demodulators, multiplexers, de-multiplexers, network communication devices, wireless devices, antennas, modems, and any other type of device configured to enable data communication via any suitable communication network. Furthermore, communication network 422 may be any appropriate network allowing communication between or among one or more computing systems, such as, for example, the Internet, a local area network, a power-line communication network, a telephone network, a wireless network, or a wide area network.

Controller 400 can include one or more processors 410, a memory 404 or the like, and input/output (I/O module 412) configured to interface with bus 402 and socket 304 (not shown in FIG. 4). Processor 410 may include one or more processing devices or cores (not shown). In some embodiments, processor 410 may be a plurality of processors, each having either one or more cores. Processor 410 can be configured for execution of instructions fetched from memory 404, for example from memory block 420, or fetched from storage device 408, or from a remote device connected via network 422. In the latter case, the instructions may originate from any one of database 424, data center 426, gateway device 428, and remote diagnostics device 430.

For example, and not by limitation, memory 404 may include instructions that, when executed by processor 410, cause processor 410 to fetch, decode, and execute instructions from database 424. Or the instructions may be obtained from a server located at data center 426, which can be a part of a control infrastructure design to monitor, control, and manage a plurality of luminaires like luminaire 100, each being fitted with controllers such as controller 400. Alternatively, the instructions may be pre-programmed in to memory 404 prior to deploying controller 400.

In some embodiments, the instructions may originate from gateway device 428, which can be an intermediate device connected to a plurality of luminaires like luminaire 118, each being fitted with controllers such as controller 400. Further gateway device 428 may serve as an interface between the plurality of luminaires and a single data center, such as data center 426. Yet in other embodiments, instructions may be fetched from remote diagnostics device 430, which can be, for example, a device operated by a service technician.

Furthermore, without loss of generality, memory 404 may include a volatile or non-volatile, magnetic, semiconductor, tape, optical, removable, non-removable, read-only, random-access, or other type of storage device or non-transitory computer-readable computer medium.

The functionality of controller 400 is imparted by its structure. The structure of controller 400 is provided by the software or firmware contained in a plurality of memory sectors of memory 404, of which only memory block 414, memory block 416, memory block 418, and memory block 420 are shown for clarity.

In some embodiments, for example, memory block 414 may include instructions that, when executed by processor 410, cause processor 410 to parse one or more GPS messages received from GPS module 408 to extract information from the messages. The information can include data that is distinct from coordinates. However, the data may be associated with a plurality of coordinates that are outputted to processor 410 by GPS module 408 upon receiving signals from a plurality of satellites (such as the satellites shown in FIG. 1).

The received messages may be National Marine Electronics Association (NMEA) messages, which are a standard means of providing information about coordinates from a GPS module. Processor 410 may be configured to parse messages in one or more of a plurality of message formats other than NMEA-type messages. For example, information that is distinct from the coordinates can be extracted from received RMC, GSA, and GSV messages. RMC messages can include information about latitude, longitude, and timing information. GSA messages can include identification data (PRN) of all the satellites which provide information used in calculating the coordinates, as well as Geometric Dilution of Precision information. GSV messages can include information about the signals provided by the satellites, such as satellite PRN data, signal-to-noise-ratio of the each of the received signals, elevation angles, and azimuth angles of the satellites. Further, received messages can also include velocity information.

Furthermore, in general, the extracted information can be any other information included in an NMEA message that is not the coordinate. And in some embodiments, the information can also be extracted from a plurality of GPS messages, rather than from just one GPS message.

One of skill in the art will readily recognize that the above message types are described only for illustrative purposes and that other types of message formats are contemplated. In general any message that include information other than or additional to GPS coordinates can be used by processor 410 upon executing instructions from memory block 414.

Instructions from other memory blocks in memory 404, when executed by processor 410, can cause processor 410 to perform certain operations on the extracted information. For instance, processor 410 may be configured by the instructions to estimate an error in the true position of the luminaire based on the extracted information. In one embodiment, processor 410, can use the extracted information arriving along with the coordinates from GPS module 408 to estimate an error in the unknown true position, i.e. the error in the coordinates provided by GPS module 408. For example, processor 410 may use a pre-defined threshold to determine whether to accept or reject the received coordinates. The pre-defined threshold may be preprogrammed in memory 404, and it may be determined using a calibration procedure which is as follows, according to an embodiment.

Using a GPS module (i.e. a controller 404) with known reference coordinates, NMEA messages can be collected at regular intervals for a period extending to one or more days. Then processor 410 can be configured to calculate the maximum SNR, the minimum SNR, the average SNR, the sum of SNRs, the variance of SNRs, minimum elevation and/or azimuth angle for all of the signals received. These SNR figures may all be measured by GPS module 408, and the resulting statistics may be then used in an equation (e.g. a linear combination) with arbitrary coefficients to estimate errors (in meters) of the reported coordinates from the known reference coordinates, thereby allowing an error threshold to be determined.

In a luminaire where the position is unknown, processor 410 may be configured to calculate the variables mentioned above and use them in a linear combination that uses the same coefficients utilized in the calibration procedure. The result of that linear combination can then be analyzed, by processor 410, to determine whether the error exceeds the error threshold. In some embodiments, the criterion for rejection can be selected as the measured error being above the error threshold by no more than a predefined percentage.

Processor 410 can also be used to discard coordinates based on variables other than those mentioned above. For example, any coordinate that is estimated from signals originating from fewer than four satellites can be discarded, since accuracy in GPS positioning is hampered when fewer than four satellites are used to compute a position. Moreover, if the coordinates originate from signals originating from one or more satellites that have elevation and/or azimuth angles less than a predetermined angle threshold, these coordinates can also be discarded. This is because satellites that do not meet these angle thresholds are most likely not in view of the luminaire, and their signals are very likely to be reflected before reaching controller 400. Furthermore, if a coordinate is associated with NMEA data indicating a non-zero velocity, that coordinate can be automatically be discarded by processor 410. This is because the controller 400, hence the luminaire, is known to be stationary. All operations performed by processor 410 to exclude coordinates based on techniques that do not require the use of a calibrated model (i.e. elevation angle thresholding, velocity thresholding, etc. can be thought of as a filtering operation. After filtering the coordinates with such techniques, the processor perform error estimation over the remaining coordinates which are more likely to be correct.

Figure 5:
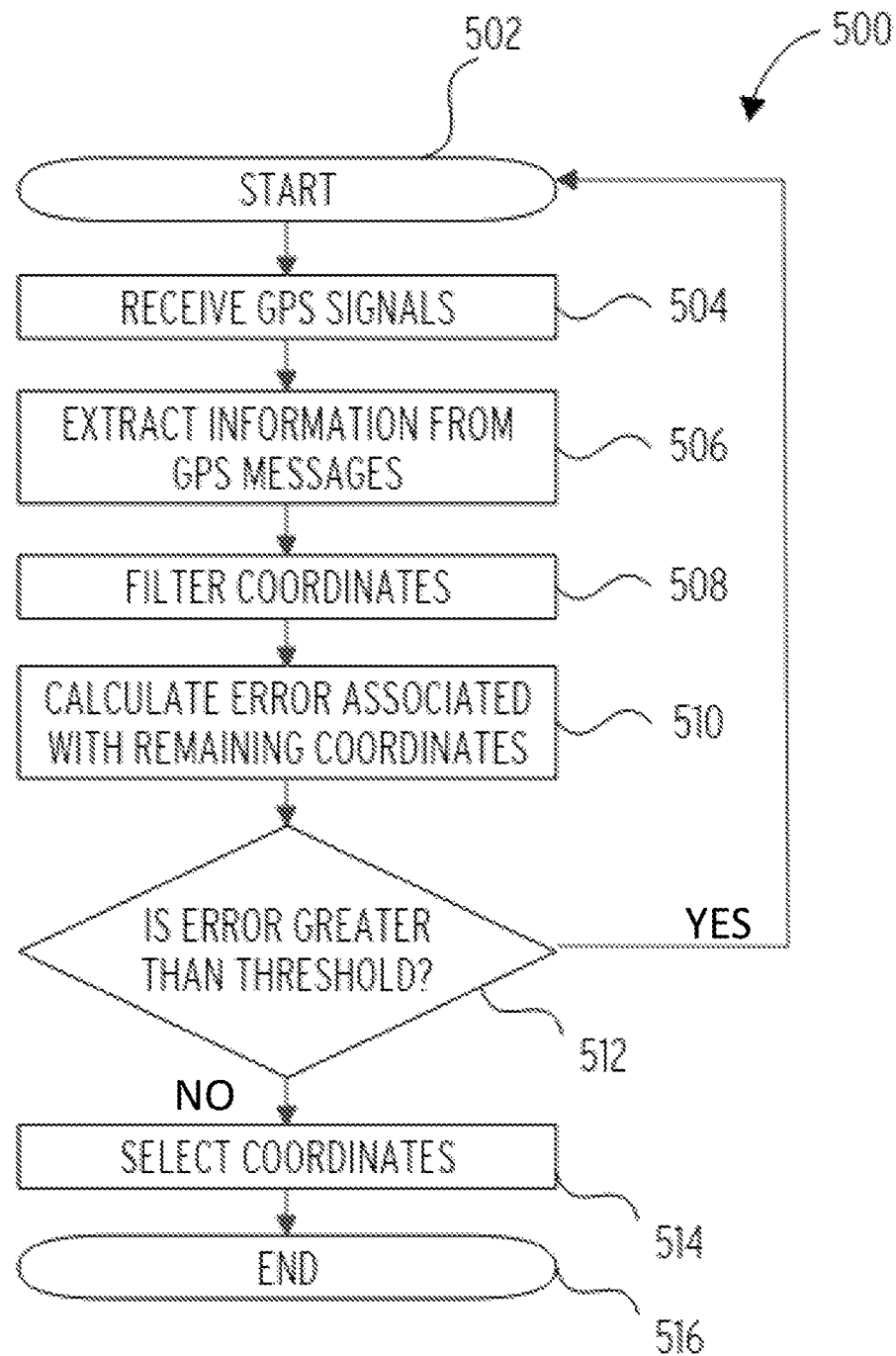
FIG. 5 depicts a flow chart, according to an embodiment.

Having set forth the structure of various embodiments of the invention, a method 500 consistent with the operation of these embodiments is now described in the context of FIG. 5. All the steps of method 500 can be performed sequentially in the context of one program being executed by a processor, such as processor 410. Furthermore, in some cases, the invention may be embodied in a computer-readable medium which includes instructions that cause a processor to perform some or all of the steps of method 500.

Method 500 begins at start block 502 and includes receiving GPS signals at block 504. The GPS signals may originate from one or more the satellites shown in FIG. 1, and they may be received using GPS module 408 of controller 400. Method 500 can further include, at block 506, extracting information from GPS messages generated by the GPS module 408. The information can include, velocity, SNR, elevation angle, azimuth angles, satellite ID, timing information, etc. In general, the extracted information can include any of the information mentioned above in the context of GPS-related messages. The messages may be NMEA messages as well as RMC, GSA, and GSV-type messages.

Following the extraction of information, coordinates are filtered at block 508. Filtering the coordinates can include discarding coordinates that are associated with non-zero velocity, coordinates that were computed with signals originating from fewer than four satellites, and/or coordinates that are associated with signals that originate from satellites failing to meet an elevation and/or azimuthal angle threshold. Furthermore, filtering the coordinates, can include discarding coordinates that are associated with signals having SNRs that are below an SNR threshold.

Once coordinates are filtered, the method 500 can include calculating an error associated with the remaining coordinates (block 510). The error can be calculated using a linear combination of parameters based on at least four of SNR maximum, minimum, average, and variance, elevation angle, and azimuthal angle. The error can then be compared to a predetermined error threshold to determine whether the remaining coordinates should be discarded (decision block 512). Specifically, the remaining coordinates are discarded and method 500 starts over (or it can end) if the calculated error is greater than the predetermined error threshold. Otherwise, if the calculated error is less than the error threshold, coordinates are selected as an estimate of the position of controller 400 (block 514) and method 500 ends at block 516.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:
1. A method, comprising:
receiving a plurality of first GPS messages;
computing a plurality of different types of signal to noise ratio (SNR) statistics from the plurality of first GPS messages;
computing an error threshold based upon a combination of the different types of SNR statistics;
receiving, at a controller coupled to a luminaire, a second GPS message;
extracting a plurality of coordinates from the second GPS message;
extracting information from the second GPS message, the information including data associated with the plurality of coordinates;
determining, based on the information and not from the coordinates, an error associated with each coordinate of the plurality of coordinates;
discarding coordinates for which the error fails to satisfy a predetermined condition, the predetermined condition based at least on the error threshold; and
selecting, as a location of the luminaire, the coordinates for which the error satisfies the predetermined condition.

2. The method of claim 1, wherein the information includes time information.

3. The method of claim 1, wherein the information includes information of a satellite providing a GPS signal to the controller.

4. The method of claim 1, wherein additional information is extracted from a plurality of other GPS messages.

5. The method of claim 1, wherein the information includes Geometric Dilution of Precision data (GDP) data.

6. The method of claim 1, wherein the information includes data associated with all satellites that are in view of the controller.

7. The method of claim 6, wherein the data include the satellite identification data (PRN), signal to noise ratio (SNR) data, and elevation angle and azimuth data.

8. The method of claim 7, wherein the method further includes measuring the SNR data from satellite signals received by the controller.

9. A non-transitory computer-readable storage medium including instructions that when executed by a processor, cause the processor to perform operations comprising:
receiving a plurality of first GPS messages;
computing a plurality of different types of signal to noise ratio (SNR) statistics from the plurality of first GPS messages;
computing an error threshold based upon a combination of the different types of SNR statistics;
receiving, at a controller coupled to a luminaire, a second GPS message;
extracting a plurality of coordinates from the second GPS message;
extracting information from the second GPS message, the information including data associated with the plurality of coordinates;
determining, based on the information and not from the coordinates, an error associated with each coordinate of the plurality of coordinates;
discarding coordinates for which the error fails to satisfy a predetermined condition, the predetermined condition based at least on the error threshold; and
selecting, as a location of the luminaire, the coordinates for which the error satisfies the predetermined condition.

10. The computer-readable storage medium of claim 9, wherein the information includes time information.

11. The computer-readable storage medium of claim 9, wherein the information includes information of a satellite providing a GPS signal to the controller.

12. The computer-readable storage medium of claim 9, wherein additional information is extracted from a plurality of other GPS messages.

13. The computer-readable storage medium of claim 9, wherein the information includes Geometric Dilution of Precision data (GDP) data.

14. The computer-readable storage medium of claim 9, wherein the information includes data associated with all satellites that are in view of the controller.

15. The computer-readable storage medium of claim 14, wherein the data include the satellite identification data (PRN), signal to noise ratio (SNR) data, and elevation angle and azimuth data.

16. The computer-readable storage medium of claim 15, wherein the operations further includes measuring the SNR data from satellite signals received by the controller.

17. A system, the computing apparatus comprising:
a processor; and
a memory storing instructions that, when executed by the processor, cause the processor to perform operations comprising:
receiving a plurality of first GPS messages;
computing a plurality of different types of signal to noise ratio (SNR) statistics from the plurality of first GPS messages;
computing an error threshold based upon a combination of the different types of SNR statistics;
receiving, at a controller coupled to a luminaire, a second GPS message;
extracting a plurality of coordinates from the GPS message;
extracting information from the GPS message, the information including data associated with the plurality of coordinates;
determining, based on the information and not from the coordinates, an error associated with each coordinate of the plurality of coordinates;
discarding coordinates for which the error fails to satisfy a predetermined condition, the predetermined condition based at least on the error threshold; and
selecting, as a location of the luminaire, the coordinates for which the error satisfies the predetermined condition.

18. The system of claim 17, wherein the information includes time information.

19. The system of claim 17, wherein the information includes information of a satellite providing a GPS signal to the controller.

20. The system of claim 17, wherein the operations further include measuring signal-to-noise ratio (SNR) data of received GPS satellite signals and the error is determined based on the SNR data.

* * * * *